(12) United States Patent
Isogai

(10) Patent No.: US 12,151,557 B2
(45) Date of Patent: Nov. 26, 2024

(54) IN-VEHICLE CONTROL SYSTEM

(71) Applicant: DENSO CORPORATION, Kariya (JP)

(72) Inventor: Toshiaki Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 378 days.

(21) Appl. No.: 17/643,356

(22) Filed: Dec. 8, 2021

(65) Prior Publication Data

US 2022/0097526 A1 Mar. 31, 2022

Related U.S. Application Data

(63) Continuation of application No. PCT/JP2020/014461, filed on Mar. 30, 2020.

(30) Foreign Application Priority Data

Jun. 11, 2019 (JP) .................. 2019-108850

(51) Int. Cl.
*B60K 35/00* (2024.01)
*B60K 35/26* (2024.01)
(Continued)

(52) U.S. Cl.
CPC .............. *B60K 35/00* (2013.01); *B60L 58/10* (2019.02); *B60K 35/26* (2024.01); *B60K 35/28* (2024.01);
(Continued)

(58) Field of Classification Search
CPC ........ B60K 35/00; B60K 35/26; B60K 35/28; B60K 35/81; B60K 2360/167;
(Continued)

(56) References Cited

U.S. PATENT DOCUMENTS

2015/0203059 A1* 7/2015 Narita ............... H04W 52/0261
307/9.1

FOREIGN PATENT DOCUMENTS

JP H08167226 A * 6/1996
JP 2001-268470 A 9/2001
(Continued)

*Primary Examiner* — Ig T An
*Assistant Examiner* — Christine Nguyen Huynh
(74) *Attorney, Agent, or Firm* — Harness, Dickey & Pierce, P.L.C.

(57) ABSTRACT

An in-vehicle control system is equipped in a vehicle, and includes an image drawer, a reproduction controller and a voltage detector. The image drawer draws a pictorial measuring instrument as an image representing a measuring instrument related to travelling of the vehicle. The vehicle includes an audiovisual information output device and a reproduction signal generator. The audiovisual information output device outputs audiovisual information for an occupant in the vehicle. The reproduction signal generator generates a reproduction signal for causing the audiovisual information output device to output the audiovisual information. The reproduction controller reproduces the audiovisual information, stops reproduction of the audiovisual information, resumes the reproduction of the audiovisual information from a stop position of the reproduction of the audiovisual information, and transmits an instruction to the reproduction signal generator for generating the reproduction signal. The voltage detector detects a value of a voltage of a battery equipped in the vehicle.

9 Claims, 3 Drawing Sheets

(51) Int. Cl.
*B60K 35/28* (2024.01)
*B60K 35/81* (2024.01)
*B60L 58/10* (2019.01)

(52) U.S. Cl.
CPC ........ *B60K 35/81* (2024.01); *B60K 2360/167* (2024.01); *B60K 2360/169* (2024.01)

(58) Field of Classification Search
CPC ............ B60K 2360/169; B60K 35/213; B60K 35/214; B60K 35/22; B60K 35/60; B60L 58/10; B60L 58/12; B60L 2240/547; B60L 2250/16; B60R 16/02; B60R 16/03; Y02T 10/70; G11B 20/10; G11B 31/00
See application file for complete search history.

(56) References Cited

FOREIGN PATENT DOCUMENTS

| | | |
|---|---|---|
| JP | 2004-348887 A | 12/2004 |
| JP | 2018-083441 A | 5/2018 |

\* cited by examiner

IN-VEHICLE CONTROL SYSTEM

CROSS REFERENCE TO RELATED APPLICATIONS

The present application is a continuation application of International Patent Application No. PCT/JP2020/014461 filed on Mar. 30, 2020, which designated the U.S. and claims the benefit of priority from Japanese Patent Application No. 2019-108850 filed on Jun. 11, 2019. The entire disclosures of all of the above applications are incorporated herein by reference.

TECHNICAL FIELD

The present disclosure relates to an in-vehicle control system that outputs audiovisual information that is a sound or an image.

BACKGROUND

An audio reproduction device may store a reproduction start position at the time of a power supply being turned on, when the power supply is turned off. The audio reproduction device may start the reproduction of a music file from the reproduction start position that has been stored.

SUMMARY

The present disclosure describes an in-vehicle control system including an image drawer, a controller, and a voltage detector.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
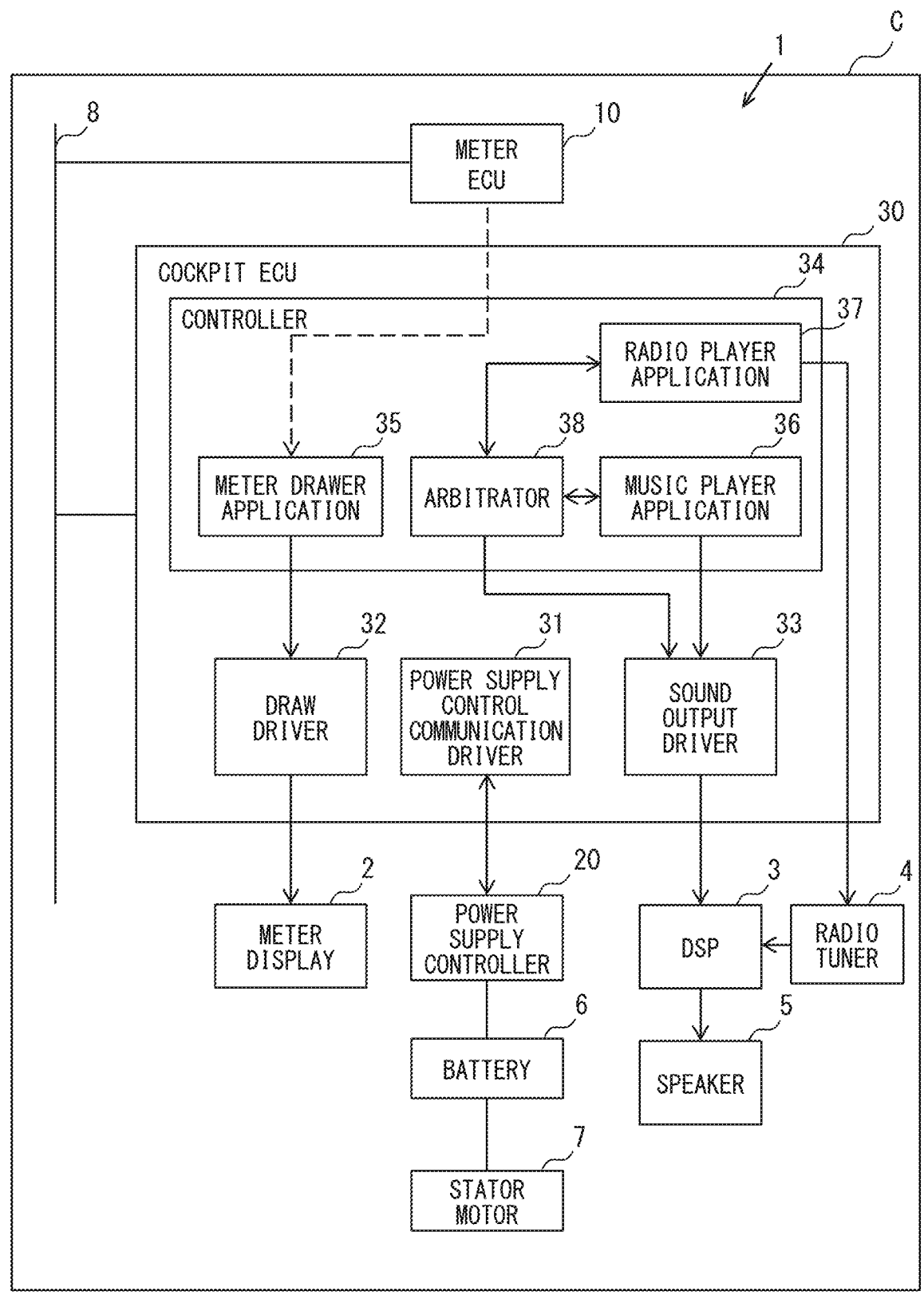
FIG. 1 illustrates a configuration of an in-vehicle control system.

In a situation where a device for reproducing music is equipped in a vehicle, the device is powered by a battery equipped in the vehicle. The voltage of the battery may temporarily decrease at the time of, for example, starting an engine. Therefore, in a situation where the device for reproducing music is installed in the vehicle, the operation may be stopped by a decrease in the voltage of the battery, even though the power supply is not turned off.

In a vehicle, a measuring instrument related to the travelling of the vehicle may be displayed as an image on a display. The image showing the measuring instrument related to the travelling of the vehicle may also be referred to as a pictorial measuring instrument. It should be avoided as much as possible that the pictorial measuring instrument vanishes due to a decrease in the battery voltage. An electronic control unit (ECU) for drawing the pictorial measuring instrument is set to be operated even at a lower voltage.

The vehicle may also be equipped with a device such as a digital signal processor (DSP) for generating a sound signal output to a speaker. Even though the DSP does not operate due to a decrease in the battery voltage, there is little hindrance to the driver's operation. Therefore, the device for generating the sound signal output to the speaker has a lower necessity to cope with a decrease in the battery voltage than the ECU for drawing the pictorial measuring instrument. As a result, the ECU for drawing the pictorial measuring instrument may be operated at a lower voltage as compared with the DSP.

The ECU may function as a music reproduction controller in addition to an image drawer for drawing the pictorial measuring instrument. When the music reproduction controller reproduces the music, the battery voltage drops to a voltage at which the DSP may stop the operation but the ECU may still operate. In this situation, the music reproduction controller in the ECU continues the operation, but the DSP is in a state where the sound cannot be output from the speaker since the DSP stops the operation.

When the battery voltage returns to the voltage at which the DSP is operable, the music reproducing position is ahead of the position where the music is no longer output from the speaker. A user may feel a sense of inconvenience as the reproduction position is ahead of the part where replay cannot be executed. This situation may also occur in a case where audiovisual information other than the music, for example, the sound other than the music and a video can be reproduced by the ECU.

Even when broadcast information such as a radio broadcast and a television broadcast is output to the speaker and display equipped in the vehicle, the user may feel a sense of inconvenience as the channel changes due to a decrease in the battery voltage.

According to a first aspect of the present disclosure, an in-vehicle control system is to be equipped in a vehicle. The in-vehicle control system includes an image drawer, a reproduction controller and a voltage detector. The image drawer draws a pictorial measuring instrument as an image representing a measuring instrument related to travelling of the vehicle. The vehicle includes an audiovisual information output device and a reproduction signal generator. The audiovisual information output device outputs audiovisual information for an occupant in the vehicle. The reproduction signal generator generates a reproduction signal for causing the audiovisual information output device to output the audiovisual information. The reproduction controller reproduces the audiovisual information, stops reproduction of the audiovisual information, resumes the reproduction of the audiovisual information from a stop position of the reproduction of the audiovisual information, and transmit an instruction to the reproduction signal generator for generating the reproduction signal. The voltage detector detects a value of a voltage of a battery equipped in the vehicle. The reproduction controller stops the reproduction of the audiovisual information, based on a condition that the value of the voltage detected by the voltage detector is lower than a stop voltage threshold value that is set to be higher than a value of a voltage at which the regeneration signal generator stops an operation.

In the in-vehicle control system, the reproduction controller stops the reproduction of the audiovisual information being reproduced, based on a condition that the voltage of the battery drops to be lower than the stop voltage threshold value. The stop voltage threshold value is a value higher than the voltage at which the operation of the reproduction signal generator is stopped. The reproduction controller stops the reproduction of the audiovisual information before the reproduction signal generator stops due to a voltage drop.

It is possible to inhibit the occurrence of a situation where the reproduction controller continues the operation during the stop of the reproduction signal generator. Subsequently, it is possible to inhibit the situation where the reproduction controller starts the reproduction of the audiovisual information from the stop position, the position of reproducing the audiovisual information output from the audiovisual information output device is at the position ahead of a position of the stop of the reproduction of the audiovisual information from the audiovisual information output device at the previous time, and therefore the user does not feel inconvenience.

According to a second aspect of the present disclosure, an in-vehicle control system is to be equipped in a vehicle. The in-vehicle control system includes an image drawer, a channel controller and a voltage detector. The image drawer draws a pictorial measuring instrument as an image representing a measuring instrument related to travelling of the vehicle. The vehicle includes a tuner and an audiovisual information output device. The tuner selectively sets one of channels and receive broadcast information from outside of the vehicle according to selected one of the channels and then output the broadcast information from the audiovisual information output device. The channel controller controls the selected one of the channels. The voltage detector detects a value of a voltage of a battery equipped in the vehicle. The channel controller stores the selected one of the channels, based on a condition that the value of the voltage detected by the voltage detector is lower than a stop voltage threshold value that is set to be higher than a value of a voltage at which the tuner stops an operation.

In the in-vehicle control system, the channel controller stores the channel being selected by the tuner, based on a condition that the voltage of the battery drops lower than the stop voltage threshold value. The stop voltage threshold value is a value higher than the voltage at which the operation of the tuner stops. Therefore, the channel controller stores the channel being selected by the tuner before the tuner stops due to a voltage drop.

It may be conceivable that the operation of the tuner stops due to the voltage drop and then the operation of the tuner restarts as the voltage of the battery rises at a voltage for resuming the operation of the tuner. In this situation, the channel control stores the channel before the stop of the operation of the tuner, and can resume the operation for the channel at the time where the operation of the tuner stops. It is possible to inhibit the situation where the channel at the time of resuming the operation is different from the channel before the stop of the operation. Therefore, the use does not feel inconvenience.

Hereinafter, embodiments will be described with reference to the drawings. An in-vehicle control system 1 shown in FIG. 1 is equipped in a vehicle C. The in-vehicle control system 1 controls a variety of controlled target devices equipped in the vehicle C. The controlled target devices are, for example, a meter display 2, a digital signal processor (DSP) 3 and a radio tuner 4.

The in-vehicle control system 1 includes a meter ECU 10, a power supply controller 20, and a cockpit ECU 30. Additionally, other devices such as a battery 6 and a starter motor 7 are equipped in the vehicle C.

The meter display 2 is arranged at a position that can be visually recognized by an occupant in a passenger compartment of the vehicle C. As the meter display 2, a liquid crystal display or an organic EL display can be used. The meter display 2 can display various images.

Figure 2:
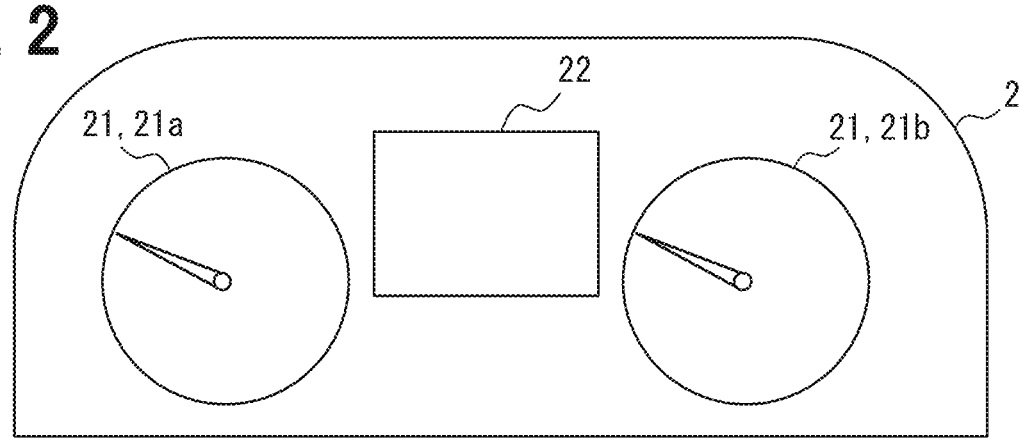
FIG. 2 illustrates an image displayed on a meter display.

FIG. 2 illustrates an image displayed on the meter display 2. A pictorial measuring instrument 21 is displayed on the meter display 2. The pictorial measuring instrument 21 is a measuring instrument related to the travelling of the vehicle C. FIG. 2 illustrates a pictorial speedometer 21a and a pictorial tachometer 21b as the pictorial measuring instrument 21. The pictorial speedometer 21a is an image illustrating the present speed of the vehicle C. The pictorial tachometer 21b is an image illustrating the rotational speed of the engine adapted in the vehicle C. Since it is necessary for the meter display 2 to display the pictorial measuring instrument 21, the meter display 2 operates even at a lower voltage such that the display hardly vanishes at the time of a voltage drop of the battery 6.

In order to draw the image on the meter display 2, it is necessary that both of the meter ECU 10 and the cockpit ECU 30 are in operation. Therefore, the meter ECU 10 and the cockpit ECU 30 also operate at the lower voltage, as similar to the meter display 2. The voltage at which the DSP 3 and the radio tuner 4 stop the operation is higher than the voltage at which the meter display 2 stop the operation.

In addition to two pictorial measuring instruments 21, an operation state display region 22 is set at the meter display 2. The operation state display region 22 is a region where an image indicating the operation state of the multimedia application is displayed. The multiple application includes, for example, a music player application 36 and a radio player application 37 as illustrated in FIG. 1.

The image indicating the operation state of the multimedia application is, for example, a reproduction state image as an image indicating the reproduction state, if the music player application 36 executes the music reproduction. The reproduction state image is, for example, an image including a symbol or a character indicating the execution of the music reproduction. The application whose state is displayed on the operation state display region 22 is an application whose sound output authorization is provided by an arbitrator 38. The sound output authorization may also be referred to as a sound authorization or a sound right. The sound authorization authorizes the speaker 5 to output the sound.

The image corresponding to the application to which the sound authorization is provided is also displayed on the operation state display region 22. For example, if the sound authorization is provided to the music player application 36, the image showing the music player application 36 is displayed on the operation state display region 22. The image showing whether or not the music player application 36 is reproducing the music and whether or not the music reproduction is stopping is also displayed on the operation state display region 22. When the sound authorization is not provided to any of the applications, the operation state display region 22 does not display an image corresponding to an application.

As illustrated in FIG. 1, the DSP 3 receives a sound signal as a digital signal from the audio output drier 33, the DSP 3 adjusts the digital signal and then generates a sound signal as an analog signal and outputs the sound signal to the speaker 5. The sound output from the speaker 5 is one of the audiovisual information. The speaker 5 outputting the sound is an audiovisual output device.

The DSP 3 generates the sound signal for outputting the sound from the speaker 5. When the sound signal represents music recorded in a non-volatile recording medium, the sound signal is a signal for reproducing the music, in other words, a reproduction signal. The DSP 3 is a reproduction signal generator for generating the reproduction signal.

The radio tuner 4 is connected to an antenna for a radio. The radio tuner 4 receives radio waves superimposed on the radio broadcast transmitted from the outside of the vehicle C through the antenna. The radio broadcast is modulated and amplified from the received radio wave and output to the DSP 3. The DSP 3 generates the sound signal for outputting the radio broadcast as the sound from the speaker 5, based on a signal indicating the radio broadcast received from the radio tuner 4. The radio broadcast includes broadcast information. The radio tuner 4 can select and set one channel for receiving the radio broadcast from multiple channels. The received channel is controlled by the radio player application 37.

The battery 6 supplies electric power to various electrical devices equipped in the vehicle C. For simplification of drawing, FIG. 1 illustrates that a line is connected between the battery 6 and the power supply controller 20 and between the battery 6 and the starter motor 7. The battery 6 also supplies electric power to, for example, the meter display 2, the DSP 3, the radio tuner 4 and the meter ECU 10. The voltage of the battery 6 is usually about 13V to 15V. A voltage regulator circuit may also be provided between an electrical device equipped in the vehicle and the battery 6 to adjust the battery voltage to a voltage corresponding to the operating voltage of the electrical device.

The starter motor 7 is a motor that starts the activation of the engine. The starter motor 7 operates the supply of the electric power from the battery 6. A large amount of electric power is required from the starter motor 7 to operate. When the starter motor 7 operates, the electric power supplied to other electrical devices other than the starter motor 7 may decrease.

The meter ECU 10 and the cockpit ECU 30 are connected to an in-vehicle LAN bus 8. The meter ECU 10 and the cockpit ECU 30 can receive and transmit a signal mutually through the in-vehicle LAN bus 8. The meter ECU 10 and the cockpit ECU 30 can acquire a signal from other devices equipped in the vehicle C through the in-vehicle LAN bus 8.

The meter ECU 10 acquires information such as a signal indicating the speed of the vehicle C and a signal indicating the rotational speed of the engine through the in-vehicle LAN bus 8 for drawing the pictorial measuring instrument 21 displayed on the meter display 2. The information may also be referred to as meter drawing information. The acquired meter drawing information is sequentially transmitted to the meter drawing application included in the cockpit ECU 30. In FIG. 1, a broken line connecting the meter ECU 10 and the meter drawing application 35 indicates that the meter drawing information is transmitted from the meter ECU 10 to the meter drawing application 35. In the present embodiment, the signal transmission/reception between the meter ECU 10 and the cockpit ECU 30 is executed through the in-vehicle LAN bus 8. The meter ECU 10 and the cockpit ECU 30 may also be directly connected without through the in-vehicle LAN bus 8.

Figure 3:
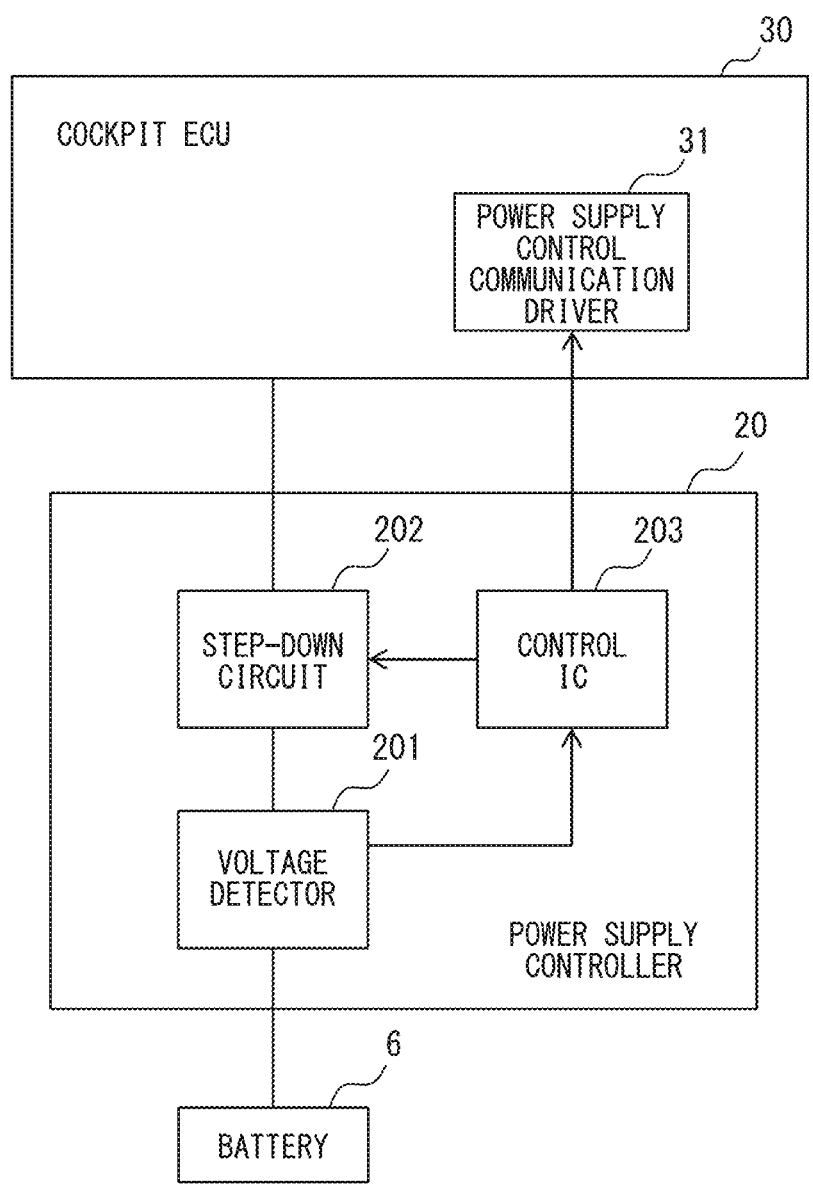
FIG. 3 illustrates a configuration of a power supply controller.

The power supply controller 20 adjusts the voltage of the battery 6 to supply the voltage to the cockpit ECU 30. FIG. 3 illustrates the internal configuration of the power supply controller 20. The power supply controller 20 includes a voltage detector 201, a step-down circuit 202 and a control integrated circuit (IC) 203.

The voltage detector 201 sequentially detects the battery voltage, in other words, a value of the voltage supplied by the battery 6. The voltage value detected by the voltage detector 201 is transmitted to a power supply control communication driver 31 included in the cockpit ECU 30 through the control IC 203.

The voltage detector 201 compares the detected voltage value with a stop voltage threshold value THs. In a situation where the detected voltage value drops below the stop voltage threshold value THs, the situation is informed to the power supply control communication driver 31 included in the cockpit ECU 30. The voltage detector 201 also compares the detected voltage value with a resume voltage threshold value THr. In a situation where the voltage value once dropped below the stop voltage threshold THs and then the voltage value has been increasing to be higher than the resume voltage threshold value THr, the situation is informed to the power supply control communication driver 31.

The stop voltage threshold value THs is set at a value higher than the voltage at which the DSP 3 stops the operation. For example, the stop voltage threshold value THs is set at a voltage, which is two voltages higher than the voltage at which the DSP 3 stops the operation. Additionally, the stop voltage threshold value THs may also be set at a value lower than the voltage of the battery 6 at an ordinary state.

The cockpit ECU 30 operates at a relatively low voltage as compared with the DSP 3. The stop voltage threshold value THs is a value successively higher than a voltage at which the controller 34 cannot execute the application due to a decrease in the battery voltage.

The resume voltage threshold THr is set to be higher than or equal to the stop voltage threshold THs. The resume voltage threshold THr may also be identical to the stop voltage threshold value THs. The resume voltage threshold value THr may also be set to a value higher than the stop voltage threshold value THs. For example, the resume voltage threshold value THr is set to a value 2 volts higher than the stop voltage threshold value THs. Additionally, the resume voltage threshold value THr may also be set at a value equal to or lower than the voltage of the battery 6 at an ordinary state.

The step-down circuit 202 receives the voltage of the battery 6 through the voltage detector 201. The step-down circuit 202 includes a DC-DC converter, and decreases the input voltage to a predetermined voltage and outputs the decreased voltage to the cockpit ECU 30. For example, the voltage output from the step-down circuit 202 may be set to 3.3 V. The step-down circuit 202 has a low dropout (LDO). Therefore, the step-down circuit 202 operates even through the voltage of the battery 6 drops. The control IC C203 controls an operation, that is, turn-on and turn-off of the step-down circuit 202. The electric power from the battery is supplied also to the control IC 203. A step-up circuit may be provided between the battery 6 and the control IC 203 for continuing the operation of the control IC 203 even though the voltage of the battery 6 drops.

As illustrated in FIG. 1, the cockpit ECU 30 includes a power supply control communication driver 31, a draw driver 32, an audio output driver 33 and a controller 34. The power supply control communication driver 31 is a drive that communicates with the power supply controller 20. The power supply control communication driver 31 communicates with the power supply controller 20 to acquire the voltage value detected by the voltage detector 201.

The draw driver 32 is a driver controlling the drawing on the meter display 2. The draw driver 32 displays an image represented by an image data generated by the meter drawing application 35 on the meter display 2.

The audio output driver 33 is a driver that controls the DSP 3. The audio output driver 33 outputs an audio signal as a digital signal provided from the music player application 36 to the DSP 3.

The controller 34 includes at least one processor. The controller 34 can be realized by, for example, a computer including a CPU, a ROM, a RAM, an I/O, a bus line connecting those components, and the like. The ROM stores a program for causing a general-purpose computer to function as the controller 34. Note that executing the program stored in the ROM by the CPU means that a method corresponding to the program is executed.

FIG. 1 illustrates the meter drawing application 35, the music player application 36, and the radio player application 37 as a part of the program stored in the ROM. The application may also be referred to as an application program.

The controller 34 functions as an image drawer to draw the pictorial measuring instrument 21 as the CPU executes the meter drawing application 35 while utilizing a temporary function in the RAM. When the CPU executes the music player application 36 while utilizing the RAM, the controller 34 functions as a reproduction controller to reproduce the music as the audiovisual information.

When the application program is executed, the subject when a computer executes a certain function may be described as an application program instead of the computer. In the following, when the meter drawing application 35 is executed, the execution subject at the time where the controller 34 functions as the image drawer is described as the meter drawing application 35. When the music player application 36 is executed, the execution subject at the time where the controller 34 functions as the reproduction controller is described as the music player application 36.

The music player application 36 causes the speaker 5 to output the music data stored in the non-volatile storage medium through the audio output driver 33 and the DSP 3. The music player application 36 includes a function for reproducing and stopping the music and for executing reproduction from the stop position. When the music is reproduced, the music player application 36 reads music data from a CD storing the music or the non-volatile storage such as a flash memory, the sound signal indicating the music is transmitted to the DSP 3 through the audio output driver 33 based on the read music data.

The music player application 36 notifies of executing the music player application 36 to the meter drawing application 35. The meter drawing application 35 displays an image indicating the execution of the music player application 36 on the operation state display region 22 based on a condition that the notification is received.

When the CPU of the controller 34 executes the radio player application 37 while utilizing the RAM, the controller 34 functions as a channel controller to turn on and off the radio tuner 4 and controls the channel selected by the radio tuner 4. When the radio player application 37 is executed, the execution subject at the time where the controller 34 functions as the reproduction controller is described as the radio player application 37. The controller 34 can simultaneously execute multiple applications.

(Sound Authorization Grant Process in Arbitrator)

The arbitrator 38 executes the program stored in the ROM while the CPU of the controller 34 utilizes the RAM. The arbitrator 38 decides whether or not to grant respective sound authorizations to multiple applications having a function of outputting sound from the speaker 5. The application having a function for outputting sound from the speaker 5 includes the music player application 36 and the radio player application 37 in FIG. 1. The sound authorization is normally given to one application under execution.

The arbitrator 38 may not give the sound authorization to any application under execution. The arbitrator 38 does not grant the sound authorization to any application under execution, based on a condition that the voltage value detected by the voltage detector 201 drops below the stop voltage threshold value THs.

In a situation where the voltage value detected by the voltage detector 201 drops below the stop voltage threshold value THs, the power supply controller 20 notifies of the situation to the power supply control communication driver 31. The arbitrator 38 acquires the situation where the voltage value detected by the voltage detector 201 drops below the stop voltage threshold value THs from the power supply control communication driver 31.

The arbitrator 38 does not grant the sound authorization to any application based on a condition that the battery voltage drops below the stop voltage threshold value THs. When the voltage value detected by the voltage detector 201 drops below the stop voltage threshold value THs, the sound authorization is denied in a situation of providing the sound authorization is given to the application.

In a state where the sound authorization is given to the music player application 36, the sound authorization is denied based on a condition that the battery voltage drops below the stop voltage threshold THs. For the music player application 36, the reproduction of the music is stopped based on a condition that the battery voltage drops below the stop voltage threshold value THs. In a situation where the sound authorization is denied, the application such as the music player application 36 executes fade-out processing for gradually lowering the sound volume and then stops the reproduction. The application capable of resuming the reproduction from the stop position such as the music player application 36 also stores the final output position, in other words, the stop position. In a situation where the sound authorization is denied for the music player application 36, the music player application 36 notifies of the sound authorization being denied to the meter drawing application 35.

After the arbitrator 38 denies the sound authorization for the application to which the sound authorization has been granted, the sound authorization is again granted based on a condition that the battery voltage increases above the resume voltage threshold value THr. As a condition for re-granting the sound authorization, it is necessary that the application to which the sound authorization has been granted is continuously in the execution state. For example, when the application is stopped by the user's operation or when the ignition is turned off, the sound authorization is not again granted even though the battery voltage increases to be higher than the resume voltage threshold value THr. The application to which the sound authorization is again granted, in other word, the application again receiving permission for reproduction resumes the reproduction from the stop position that has been stored.

(Mute Process in Arbitrator)

The arbitrator 38 includes a function of granting the sound authorization to the application and a function of instructing the DSP 3 to execute a mute process. The arbitrator 38 instructs the DSP 3 to execute the mute process through the audio output driver 33, based on a condition that the battery voltage drops below the stop voltage threshold value THs. The mute process is a process for preventing sound from being output from the speaker 5. After the arbitrator 38 instructs the mute process, the arbitrator 38 denies the sound authorization for the application to which the sound authorization has been granted.

The arbitrator 38 executes an unmute process, based on a condition that the battery voltage increases to be higher than the resume voltage threshold value THr. The unmute process is a process for returning the volume of sound output from the speaker to a sound volume before muting.

(Example of Control Process in In-Vehicle Control System)

Figure 4:
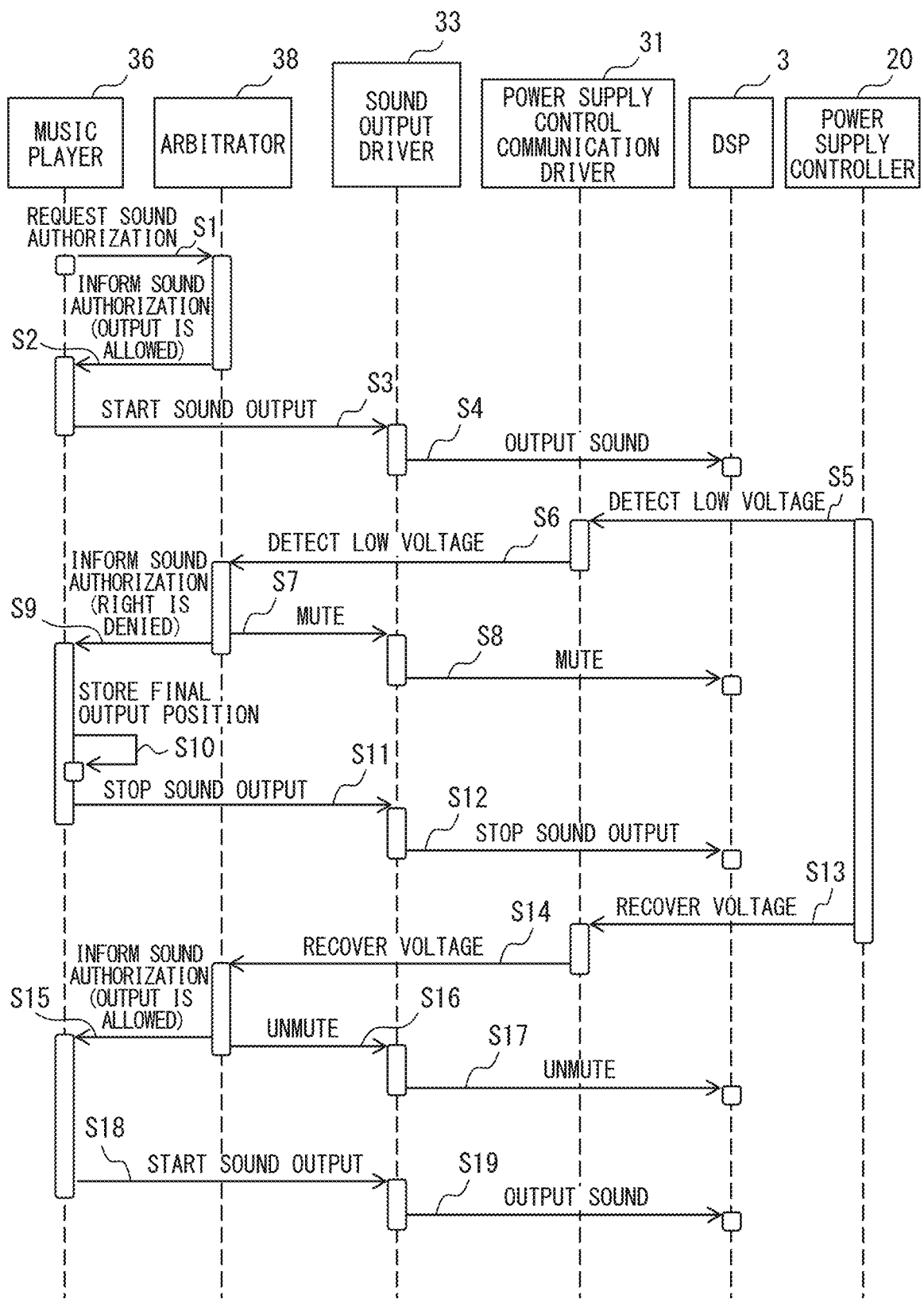
FIG. 4 illustrates an example of a control process in the in-vehicle control system with a decrease in a battery voltage.

The following describes an example of a control process in the in-vehicle control system along with a drop in the battery voltage with reference to FIG. 4. FIG. 4 describes the music player application 36 as a music player.

The music player application 36 starts the reproduction process of music through, for example, a passenger's operation in the vehicle C. In S1, the music player application 36 requests the arbitrator 38 to grant the sound authorization, in order to output the reproduced music from the speaker 5.

In S2, the arbitrator 38 notifies of the grant of sound authorization, in other words, the permission of the output from the speaker 5 to the music player application 36. Upon receiving the notification, in S3, the music player application 36 starts audio output. When the audio output is started, the music player application 36 sequentially transmits the sound signal indicating the music to be output from the speaker 5 to the audio output driver 33. In S4, the audio output driver 33 transmits the signal from the music player application 36 to the DSP 3. The DSP 3 generates the reproduction signal based on the received signal.

In S5, the power supply controller 20 detects a situation where the battery voltage has dropped to be lower than the stop voltage threshold value THs. The power supply controller 20 notifies of the situation to the power supply control communication driver 31. In S6, the power supply control communication driver 31 notifies of the situation where the battery voltage has dropped to be lower than the stop voltage threshold value THs to the arbitrator 38.

In S7, the arbitrator 38 outputs the instruction for the DSP 3 to execute the mute process to the audio output driver 33. In S8, the audio output driver 33 instructs the DSP 3 to execute the mute process, and the DSP 3 executes the mute process according to the instruction. After the arbitrator 38 outputs the instruction for the DSP 3 to execute the mute process to the audio output driver 33, in S9, the arbitrator 38 notifies of the sound authorization being denied to the music player application 36.

The music player application 36 receiving the denial of the sound authorization from the arbitrator 38 stores the final output position in S10. Subsequently, in S11, the stop of sound output is output to the audio output driver 33. In S12, the audio output driver 33 instructs the DSP 3 to stop audio output, and the DSP 3 stops the audio output according to the instruction.

As the battery voltage returns to a value to be higher than the resume voltage threshold value THr, the controller 20 notifies of the return of the battery voltage to the power supply control communication driver 31 in S13. The power supply control communication driver 31 receiving the notification of the situation where the battery voltage returns to the value higher than the resume voltage threshold value THr to the arbitrator 38.

In S15, the arbitrator 38 again notifies of the grant of sound authorization to the music player application 36. In S16, the arbitrator 38 outputs the instruction for the DSP 3 to execute the unmute process to the audio output driver 33. In S17, the audio output driver 33 instructs the DSP 3 to execute the unmute process, and the DSP 3 executes the unmute process according to the instruction.

In S18, the music player application 36 to which the sound authorization is again granted starts the reproduction from the final output position, in other words, the position where the reproduction stopped, and sequentially transmits the sound signal indicating the reproduced sound to the audio output driver 33. In S19, the audio output driver 33 transmits the signal from the music player application 36 to the DSP 3. The DSP 3 generates the reproduction signal based on the received signal.

FIG. 4 illustrates that the music player application 36 as the application for reproducing the audiovisual information. The following describes a situation where the application requesting the sound authorization is the radio player application 37. The radio player application 37 is different from the music player application 36, and is an application for outputting the radio broadcast from the speaker 5 without having a function of having reproduction from the stop position.

In a situation where the sound authorization is granted to the radio player application, in S10 of FIG. 4, the channel being reproduced is stored without storing the final output position. In S18, the reproduction of the radio broadcast in the stored channel is started. Other processing is the same as in the music player application 36.

It may be assumed that the battery voltage drops significantly and the operation is temporarily stopped up to the cockpit ECU 30 for executing the radio player application 37. Also in this situation, the operation is resumed at the channel that has been stored when the batter voltage returns and the radio player application 37 is operable. Furthermore, the operation of the cockpit ECU 30 is temporarily stopped while the sound authorization is granted to the music player application 36. When the battery voltage returns and then the music player application 36 becomes operable, S18 is executed and the reproduction is started from the final output position.

In this embodiment, the music player application 36 stops the reproduction of the music being reproduced in S11 based on a condition that the battery voltage drops to be lower than the stop voltage threshold value THs. The stop voltage threshold value THs is a value higher than the voltage at which the DSP 3 stops the operation. The music player application 36 stops the reproduction of music before the DSP 3 stops due to the voltage drop.

It is possible to inhibit the situation where the music player application 36 continues the reproduction during the stop of the DSP 3. In a situation where the music player application 36 subsequently starts the reproduction of music from the stop position in S18, it is possible to inhibit the situation where the position of reproducing music from the speaker 5 is ahead of the previous position where the reproduction of music from the speaker stops and the user feel a sense of inconvenience.

If the music player application 36 reproduces the music while the DSP 3 stops due to the voltage drop, a buzzing sound may be output from the speaker 5. However, in the present embodiment, the music player application 36 stops the reproduction of music before the DSP 3 stops due to the voltage drop. As a result, it is also possible to inhibit the situation where the buzzing sound is output from the speaker 5 during the stop of the DSP 3 due to the voltage drop.

In a period during which the music player application 36 starts the reproduction of music from the stop position, the music player application 36 may be again executed after the ignition is turned on. In the present embodiment, after the reproduction of music is stopped due to the voltage drop, the music player application 36 automatically resumes the reproduction from the position where the reproduction is stopped based on a condition that the battery voltage increases to be higher than the resume voltage threshold THr, while the music player application 36 is still in an executing state. As a result, when the battery voltage temporarily drops, the interrupted music production is resumed without any operation by the user, for example, at the time of starting the engine utilizing the starter motor 7.

In the present embodiment, the arbitrator 38 denies the sound authorization for the music player application 36 to stop the music reproduction, based on a condition that the battery voltage is lower than the stop voltage threshold value THs. In a situation where there are several applications for outputting the sound from the speaker 5, the arbitrator 38 is often adopted to determine which application produces sound from the speaker 5. In the present embodiment, the arbitrator 38 is utilized to execute the process at the time of the drop of the battery voltage. Therefore, it is possible to decrease the number of devices included in the in-vehicle control system 1 as compared with the situation without adopting the arbitrator 38.

In the present embodiment, the DSP 3 is instructed to mute the sound and the sound authorization is denied for the music player application 36. As a result, the sound authorization is denied; however, it is possible to reduce the situation where the speaker 5 outputs the buzzing sound even through the DSP 3 due to a drop in the battery voltage while the music player application 36 does not stop the music reproduction due to a fault.

In the present embodiment, when the arbitrator 38 is notified of the situation where the battery voltage is lower than the stop voltage threshold value THs, initially, the DSP 3 is instructed to mute the sound in S7 and S8, and then the sound authorization is denied for the music player application 36 is notified in S9. Even though the speed of a drop in the battery voltage is faster, it is possible that the mute process can be executed before the stop of the DSP 3. Therefore, it is possible to reduce the situation where the buzzing sound is output from the speaker 5.

In the embodiment, if the music player application 36 is executing the music reproduction, the reproduction state image indicating the reproduction state is displayed on the operation state display region 22. However, in a situation where the sound authorization is denied for the music player application 36 due to a drop in the battery voltage, the music player application 36 stops the music reproduction. At this time, it is turned to a state where the sound authorization is not provided to any of the applications, the operation state display region 22 does not display an image corresponding to an application. The state where the image corresponding to the application is not displayed refers to a display state defined based on a condition where the music reproduction is stopped due to a drop in the battery voltage.

By changing to such a state, it is possible to inhibit the situation where the image displaying the music reproduction state on the operation state display region 22 while the sound is not output from the speaker 5. In other words, it is possible to inhibit the situation where the user who is viewing the operation state display region 22 feels inconvenience.

In the present embodiment, the radio player application 37 stores the channel being selected from the radio tuner 4, based on a condition that the battery voltage drops to be lower than the stop voltage threshold value THs. The stop voltage threshold value THs has a higher value than the voltage at which the radio tuner 4 stops the operation. The radio player application 37 stores the channel being selected by the radio tuner 4, before the radio tuner 4 stops due to the voltage drop.

The radio player application 37 resumes the operation at the channel that has been stored, when the battery voltage increases to be higher than the resume voltage threshold value THr and the radio 4 resumes the operation. As a result, when the radio tuner 4 resumes the operation, it is possible to resume the operation at the channel stored at the time where the radio tuner 4 stops the operation. It is possible to inhibit the situation where the channel at the time of resuming the operation is different from the channel before the stop of the operation and causes inconvenience to the user.

Although the embodiments of the present disclosure have been described above, the present disclosure is not limited to the above embodiments, and various modified examples described below are also included in the technical scope of the present disclosure. Furthermore, various modifications other than the following can be made without departing from the gist. In the following description, elements having the same reference numerals as those used so far are the same as elements having the same reference numerals in the previous embodiments, except when specifically mentioned. When only a part of the configuration is described, the embodiment described above can be applied to other parts of the configuration.

(First Modification)

In the above embodiment, the power supply controller 20 is provided separately from the cockpit ECU 30. However, the power supply controller 20 may be disposed inside the cockpit ECU 30.

(Second Modification)

In the above embodiment, the sound is described as the audiovisual information. However, the audiovisual information may also be an image. The cockpit ECU 30 may include an application for reproducing a video stored in the non-volatile storage medium instead of the music player application, or may include both of the music player application 36 and the application for reproducing the video stored in the non-volatile storage medium. The cockpit ECU 30 may include an application for controlling a television broadcasting channel instead of the radio player application 37, or may include both of the radio player application 37 and the application for controlling the television broadcasting channel.

(Third Modification)

In the above embodiment, the radio player application 37 is an application for controlling the radio tuner 4. The radio tuner 4 can select a channel, but does not have a function of temporarily storing a broadcast. However, the radio player application 37 may receive a radio broadcast through a communication line and save the received radio broadcast, and then output the radio broadcast to the speaker from a cache. In this situation, the radio player application 37 is also a reproduction controller, and the radio player application 37 may execute the reproduction and stop of the radio broadcast, and may execute the reproduction from the stop position.

(Fourth Modification)

The controller and the method described in the present disclosure may be implemented by a special purpose computer including a processor programmed to perform one or more functions embodied by a computer program. Alternatively, the control unit and the method described in the present disclosure may be implemented by a dedicated hardware logic circuit. Alternatively, the control unit and the method described in the present disclosure may be implemented by one or more dedicated computers configured by a combination of a processor executing a computer program and one or more hardware logic circuits. The hardware logic circuits may be, for example, ASIC or FPGA.

The storage medium for storing the computer program is not limited to ROM. Alternatively, the computer program may be stored in a computer-readable, non-transitory tangible storage medium as instructions to be executed by a computer. For example, the program may be stored in a flash memory.

The process of the flowchart or the flowchart described in this application includes a plurality of sections (or steps), and each section is expressed as, for example, S1. Each section may be divided into several subsections, while several sections may be combined into one section. Furthermore, each section thus configured may be referred to as a device, module, or means.

What is claimed is:

1. An in-vehicle control system to be equipped in a vehicle, the in-vehicle control sys comprising:
    an image drawer configured to draw a pictorial measuring instrument as an image representing a measuring instrument related to travelling of the vehicle, the vehicle including an audiovisual information output device and a digital signal processor, the audiovisual information output device configured to output audiovisual information for an occupant in the vehicle, the digital signal processor configured to generate a reproduction signal for causing the audiovisual information output device to output the audiovisual information, the reproduction signal being an analog signal derived from a digital signal corresponding to the audiovisual information;
    a reproduction controller being included in an electronic control unit, the reproduction controller configured to
        reproduce the audiovisual information,
        stop reproduction of the audiovisual information,
        resume the reproduction of the audiovisual information from a stop position of the reproduction of the audiovisual information, and
        transmit an instruction to the digital signal processor for generating the reproduction signal; and
    a voltage detector configured to detect a value of a voltage of a battery equipped in the vehicle,
    wherein the digital signal processor and the electronic control unit are separate devices,
    wherein a value of a voltage at which an operation of the digital signal processor stops is set to be higher than a value of a voltage at which an operation of the reproduction controller stops, and
    wherein the reproduction controller is further configured to stop the reproduction of the audiovisual information, based on a condition that the value of the voltage detected by the voltage detector is lower than a stop voltage threshold value that is set to be higher than the value of the voltage at which the operation of the digital signal processor stops.

2. The in-vehicle control system according to claim 1, wherein the audiovisual information includes a sound, and
    wherein the audiovisual information output device includes a speaker.

3. The in-vehicle control system according to claim 1, wherein the reproduction controller is further configured to resume the reproduction of the audiovisual information from the stop position after stopping the reproduction of the audiovisual information due to a voltage drop, based on a condition that the value of the voltage detected by the voltage detector is higher than a resume voltage threshold value, and
    wherein the resume voltage threshold value is set to a value higher than the stop voltage threshold value.

4. The in-vehicle control system according to claim 1, further comprising:
    an arbitrator configured to determine whether or not to grant an authorization to the reproduction controller for outputting the audiovisual information from the audiovisual information output device,
    wherein the arbitrator is further configured to deny the authorization for the reproduction controller to which the authorization has been granted, based on a condition that the value of the voltage detected by the voltage detector is lower than the stop voltage threshold value.

5. The in-vehicle control system according to claim 4, wherein the reproduction controller is further configured to reproduce the audiovisual information from the stop position, based on a condition that the arbitrator again grants the authorization to the reproduction controller after the arbitrator denies the authorization for the reproduction controller.

6. The in-vehicle control system according to claim 4, wherein the arbitrator is further configured to instruct the digital signal processor to mute output and then deny the authorization for the reproduction controller to which the authorization has been granted, based on a condition that the value of the voltage detected by the voltage detector is lower than the stop voltage threshold value.

7. The in-vehicle control system according to claim 1, wherein the image drawer is further configured to display a reproduction state image indicating a reproduction state of the reproduction controller and the pictorial measuring instrument on an identical display,
    wherein the image drawer is configured to execute a first display state in which the reproduction state image is displayed on a region of the identical display, and is further configured to execute a second display state that is different from the first display state and is set based on a condition that the reproduction controller stops the reproduction of the audiovisual information due to a voltage drop, and
    wherein the image drawer is configured to change the first display state to the second display state, in response to that the reproduction controller stops the reproduction of the audiovisual information due to the voltage drop.

8. The in-vehicle control system according to claim 1, wherein the image drawer is included in the electronic control unit.

9. The in-vehicle control system according to claim 8, wherein the value of the voltage at which the operation of the digital signal processor stops is set to be higher than a value of a voltage at which an operation of the image drawer stops.

* * * * *